United States Patent Office 3,318,978
Patented May 9, 1967

3,318,978
HALOGENATED TELOMERS OF TRI-SUBSTITUTED PHOSPHATES
George Palethorpe, Carrboro, N.C., assignor to Monsanto Company, a corporation of Delaware
No Drawing. Filed Aug. 5, 1963, Ser. No. 300,052
5 Claims. (Cl. 260—928)

This invention relates to new compositions of matter. More particularly, the invention relates to halogenated telomers of tri-substituted phosphates.

Both halogen and phosphorus containing compounds are known to improve the flame retardant properties of flammable substances such as synthetic polymers. It is often possible, therefore, to use these compounds as additives to various synthetic polymer compositions or as surface coatings on flammable synthetic polymer compositions. A highly desirable type of flame retardant composition would be one which contains both halogen and phosphorus components within the composition.

It is an object of this invention to provide new compositions of matter.

An additional object of the invention is to provide a process for the preparation of flame proofing agents containing both halogen and phosphorus groups.

Still another object of the invention is to provide halogenated telomers of tri-substituted phosphates which are soluble, high viscosity, flame proofing agents easily incorporated into synthetic polymer compositions.

Other objects and advantages will become apparent from the description of the invention which follows.

The invention broadly involves the preparation of a soluble phosphate compound containing the elements of a polyhalomethane and terminal double bonds which are halogenated to produce the new compositions of the invention.

The tri-substituted phosphorus compounds of this invention may be referred to as "telomers." Telomers in general and a process for their production, termed "telomerization," are disclosed in U.S. Patent 2,396,261. Telomers differ from simple compounds in that the end groups of the structural unit formed from the unsaturated compound are characteristic. They differ from polymers or interpolymers in that they have a lower molecular weight and in certain other chemical and physical properties. They are usually liquids or semi-solids. The preparation of these telomers essentially involves mixing an unsaturated polysubstituted phosphate with a halomethane which acts as a solvent, in the presence of a catalyst of the type usually used for vinyl polymerization reactions. The mixture is then heated to the reflux temperature of the solvent provided it does not exceed the optimum decomposition rate of the catalyst. Preferably, the reaction mixture is stirred, while the catalyst is added. The reaction mixture is allowed to stand until the reaction is complete which usually requires from 3 to 20 hours depending on the type of compound being prepared. The product may then be isolated by any convenient means and is ready for the final halogenation step. The telomerization reaction may be represented as follows:

(I)

$$(CH_2=CH-CH_2-O)_3-P=O + CCl_4 \xrightarrow[\Delta]{cat.}$$

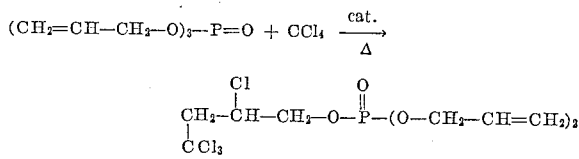

Suitable unsaturated polysubstituted phosphates which may be used include diallyl propyl phosphate, triallyl phosphate, diallylethyl phosphate, tri(3-butenyl) phosphate, tri(4-pentenyl) phosphate, tri(5-hexenyl) phosphate, trimethallyl phosphate and other tri-substituted phosphates containing at least two terminal double bonds.

The halomethanes which may be used include chlorine and bromine substituted methane compounds such as carbon tetrachloride, carbon tetrabromide, trichloromethane, tribromomethane, dichloromethane, chlorobromomethane, bromotrichloromethane and the like. Carbon tetrachloride and carbon tetrabromide are preferred. Mixtures of two or more of these halomethanes may be used in the telomerization reaction.

The telomerization reaction is conducted in the presence of a catalyst which may be any conventional catalyst useful in the polymerization of vinyl and other types of unsaturated compounds. An especially suitable catalyst might be a peroxy catalyst, for example, acetyl peroxide, benzoyl peroxide or lauryl peroxide. When solvent and monomer are dispersed in an aqueous phase, catalysts such as sodium perborate, hydrogen peroxide, sodium peroxide, additional water-soluble salts of peroxy acids and other water-soluble compounds containing the peroxy group may also be used.

The reaction can be carried out at any temperature between room temperature (25° C.) and approximately 150° C., provided the upper temperature range does not exceed the optimum decomposition rate of the catalyst.

The amount of each reactant which may be used will, of course, vary considerably according to the type of end product desired. When carbon tetrachloride is used, between 10 and 25 percent of the halomethane is usually incorporated into the product by the end of the prescribed heating period. The remaining unsaturation is eliminated by the halogenation treatment. In all instances the amount of catalyst necessary is small and is usually designated as a "catalytic amount" which may vary from around 0.05 to 2.0 percent by weight.

The ratio of carbon tetrachloride to tri-substituted phosphate should not be less than about 3.5:1 on a weight basis or around 5:1 on a molar basis. Unexpectedly, when the ratio is less than 3.5:1 by weight, the halogenated product is insoluble in desirable solvents such as acetone, dimethylformamide, dimethylacetamide, dimethyl sulfoxide, and trichloroethylene.

When bromomethanes are used as telomerization reactants, it is advantageous to use carbon tetrachloride as a coreactant. By so doing, it is possible to obtain high viscosity products without the use of Friedel-Crafts type catalysts such as $BF_3$, $AlCl_3$ as a second stage catalyst. Because of the varying reactivity of the bromomethanes, the amount incorporated in the telomer will differ and will also depend on the amount added. However, according to our invention, an amount—insufficient to achieve full saturation—is used to allow for subsequent bromination. Usually, one mole of carbon tetrabromide per mole of phosphate is used.

After telomerization, the tri-substituted phosphate is treated with a halogenation agent such as $Br_2$, $Cl_2$, HBr or HCl, to yield a halogenated phosphorous compound. This halogenation step may be illustrated by the following equation using the product of the reaction equation previously illustrated:

(II)

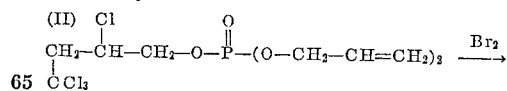

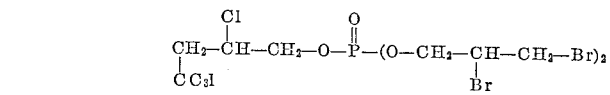

The halogenated telomers of tri-substituted phosphates of the invention may be designated by the following general formula:

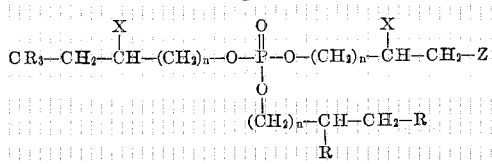

wherein R is H, Cl, Br, X may be

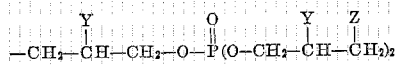

Cl, Br or H, wherein Y represents X, Cl, Br or H, Z may be $CR_3$, Br, Cl or H and $n$ an integer of from 1 to 6. The propagation of the telomerization reaction may proceed through any of the X groups as shown to achieve any desired stage of completion and molecular weight. The molecular weight limits are variable and should be limited only by the solubility of the end product. For example, using carbon tetrachloride and triallyl phosphate and brominating the resulting telomer, a reaction product might be bis(2,3-dibromopropyl)-2,4,4,4-tetrachlorobutylphosphate which has the formula:

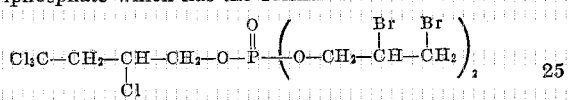

With carbon tetrabromide the resulting composition would be bis(2,3-dibromopropyl)-2,4,4,4-tetrabromobutylphosphate. The compound produced from the combination of two molecules of triallyl phosphate would be di-1,5-bis(2,3 - dibromopropylphosphate)-2-chloro-4-(2,2,2-trichloroethyl) pentane having the formula:

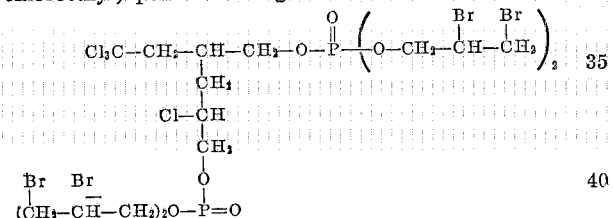

The new compositions of this invention are soluble in a number of common solvents which, because of their tendency to crosslink, is not the case when polyelfinic monomers are polymerized to higher molecular weight materials. This solubility feature renders these compositions highly useful as flame proofing agents in the production of various types of synthetic polymer compositions. The low molecular weight combined with relatively high phosphorous and halogen content renders them particularly useful as flame retardants for acrylonitrile polymer compositions. Numerous other advantages of the present invention will be apparent to those skilled in the art.

The following examples are presented as a further disclosure and illustration of the improved products of this invention and are not intended as a limitation thereof. All parts, proportions and percentages are by weight unless otherwise indicated.

EXAMPLE I

Into a 3-necked flask fitted with stirrer, thermometer and condenser was placed 77 gms. of triallylphosphate and 450 ml. of carbon tetrachloride. The mixture was heated to reflux with stirring and 0.6 gms. of benzoyl peroxide added. The reaction mixture then was allowed to stand for 12 hours. On evaporation of the excess carbon tetrachloride 100 gms. of a viscous liquid remained. This liquid was replaced in the 3-necked flask, 200 ml. of carbon tetrachloride added and again heated to reflux. Before heating for a further 5 hours, 0.3 gm. of benzoyl peroxide was added. No increase in weight was noted on evaporation. The product was treated with $Br_2$ to yield a bromine containing product weighing 200 gm. The total halogen content which was determined as bromine was 71.8 percent. The product was soluble in dimethylformamide and acetone.

EXAMPLE II

A mixture of 182 gm. of triallylphosphate and 2.4 gm. of benzoyl peroxide was placed in a flask. To this mixture was added drop wise 300 gm. of tetrabromomethane in 462 gms. of carbon tetrachloride over 1 hour. The total reaction time was 4 hours at reflux temperature. The product in the weight of 663 gm. was brominated before evaporation of the carbon tetrachloride. Total halogen content determined as bromine was 79.7 percent.

EXAMPLE III

A 237 gm. portion of bromotrichloromethane in 185 gm. of carbon tetrachloride was added to a flask containing 218 gm. of triallylphosphate, 185 gms. carbon tetrachloride and 1.44 gm. of benzoyl peroxide. The $BrCCl_3$ solution was added dropwise over a 1 hour period at reflux. Heating was continued for a total of 20 hours and a product was then brominated. The total weight of the resulting compound was 656 gm. with an analysis yielding a percent halogen content of 76.2 determined as bromine.

EXAMPLE IV

To a reaction vessel there was added 27.3 gm. of triallylphosphate, 27.3 gm. of diallylmaleate, 185 gm. of carbon tetrachloride and 0.3 gm. of benzoyl peroxide. The reaction mixture was heated for 20 hours at reflux temperatures and then brominated. The product obtained was of high viscosity and contained 59 percent total halogen determined as bromine.

EXAMPLE V

This example illustrates the insolubility effect resulting from using a carbon tetrachloride to triallyl phosphate ratio of less than 3.5:1. A mixture of 138.6 gms. of carbon tetrachloride, 54.6 gms. of triallyl phosphate (2.5:1 ratio) and 0.72 gm. of benzoyl peroxide was heated at 90° C. for 4 hours. A viscous liquid product obtained which weighed 65 gms. On bromination a solid product was produced which was insoluble in acetone and dimethylacetamide.

EXAMPLE VI

A mixture of 18.2 gms. of triallyl phosphate, 46.2 gms. of carbon tetrachloride and 0.48 gm. of benzoyl peroxide was heated at 80° for 4 hours. The product obtained by evaporation of $CCl_4$ weighed 20.5 gms. Chlorine analysis 11.5 percent.

EXAMPLE VII

A mixture of 18.2 gms. of triallyl phosphate, 92.3 gms. of carbon tetrachloride and 0.4 gm. of benzoyl peroxide was heated at 80° C. for 4 hours. The product was obtained by evaporation. Chlorine analysis 15.0 percent.

EXAMPLE VIII

In this example the carbon tetrachloride to triallyl phosphate ratio was 3.2.1 and again the product was insoluble. A mixture of 500 gms. of triallyl phosphate, 1600 gms. of carbon tetrachloride and 4 gms. of benzoyl peroxide was heated for 5 hours at reflux. An additional 2 gms. of benzoyl peroxide was added and heating continued for 16 hours. On bromination a solid product precipitated out which was insoluble in acetone, dimethylformamide and trichloroethylene.

While the examples given are mostly concerned with triallylphosphate, this does not preclude the addition of other suitable telomerizable materials which may be cotelomerized with triallylphosphate, e.g., diallyl maleate, vinyl acetate.

The foregoing detailed description has been given for clearness of understanding only, and unnecessary limitations are not to be construed therefrom. The invention

I claim:
1. Bis(2,3 - dibromopropyl) - 2,4,4,4-tetrachlorobutylphosphate.
2. Bis(2,3 - dibromopropyl) - 2,4,4,4-tetrabromobutylphosphate.
3. Bis(2,3 - dibromopropyl) - 2-bromo-4,4,4-trichlorobutylphosphate.
4. Di - 1,5-bis[di(2,3-dibromopropyl) phosphate]-2-chloro-4-(2,2,2-trichloroethyl) pentane.
5. Di - 1,5-bis[di(2,3-dibromopropyl) phosphate]-2-bromo-4-(2,2,2-tribromoethyl) pentane.

References Cited by the Examiner
UNITED STATES PATENTS

| | | | |
|---|---|---|---|
| 2,568,859 | 9/1951 | Ladd et al. | 260—963 |
| 2,574,515 | 11/1951 | Walter et al. | 260—986 |
| 2,639,292 | 5/1953 | Brannock | 260—963 |
| 3,223,755 | 12/1965 | Rimmer | 260—98 |

CHARLES B. PARKER, *Primary Examiner.*
BERNARD BILLIAN, F. M. SIKORA,
*Assistant Examiners.*